Figure 1:
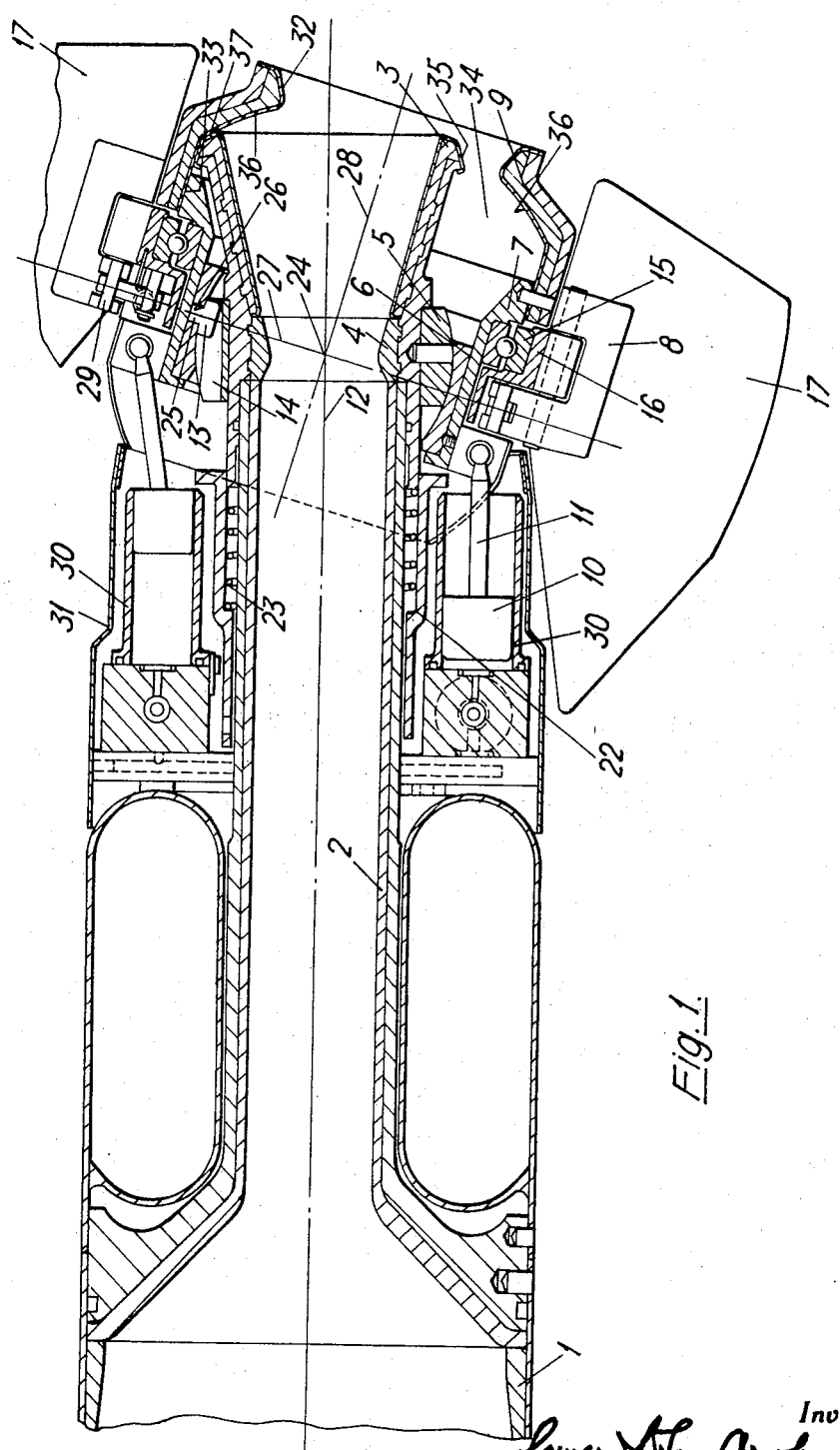

# United States Patent [19]

Crowhurst

[11] 3,764,091
[45] Oct. 9, 1973

[54] IMPROVEMENTS IN OR RELATING TO CONTROL SYSTEMS

[75] Inventor: James Arthur Crowhurst, St. Albans, England

[73] Assignee: Hawker Siddeley Dynamics Limited, Hatfield, England

[22] Filed: Apr. 30, 1971

[21] Appl. No.: 141,364

[30] Foreign Application Priority Data
Apr. 30, 1970 Great Britain .................... 3,225/70

[52] U.S. Cl. .............................. 244/3.22, 244/3.24
[51] Int. Cl. ......................... F41g 7/00, F42b 15/16
[58] Field of Search ....................... 60/35.54, 35.55, 60/228, 230, 232; 244/3.22, 3.24, 3.27–3.29

[56] References Cited
UNITED STATES PATENTS

| | | | |
|---|---|---|---|
| 3,102,390 | 9/1963 | Barnet | 60/35.55 |
| 3,438,581 | 4/1969 | Smith | 60/35.55 |
| 3,003,312 | 10/1961 | Jewell | 60/35.55 |
| 3,210,935 | 10/1965 | Fisher | 60/35.54 |

*Primary Examiner*—Benjamin A. Borchelt
*Assistant Examiner*—James M. Hanley
*Attorney*—Dowell & Dowell

[57] ABSTRACT

A steering and propulsion system for a guided missile, in which thrust vectoring of the propulsive effluent is achieved by means of a dirigible tail nozzle. The dirigible nozzle is mounted on a spherical bearing to swivel about a point lying at the centre of the throat of a fixed convergent/divergent inner nozzle disposed within the dirigible nozzle. Aft of the swivel point, the dirigible nozzle has a convergent portion leading to a divergent mouth, and the inner wall of the convergent portion is formed as a domed annular surface which is part-spherical and has its geometrical centre at the swivel point. This dome annular surface is a close running fit against the peripheral rim of the exit of the fixed inner nozzle. A set of free-spinning fins are mounted along with the dirigible nozzle so as to deflect angularly therewith.

11 Claims, 3 Drawing Figures

IMPROVEMENTS IN OR RELATING TO CONTROL SYSTEMS

This invention relates to steering and propulsion systems for aerial and space vehicles, such as guided missiles. More particularly, it is concerned with systems in which steering is accomplished by the vectored thrust principle.

In previous missile systems employing vectored thrust, difficulties have existed in regard to the conflict of aerodynamic stability and thrust vector control. One of the main problems experienced if the missile has aerodynamic stability is that performance of a conventional thrust vector control system is insufficient to give adequate control capability. This in the main is due to low angular thrust deflection performance in the case of thrust vectoring arrangements known as "semaphore" systems, i.e. inserting flags at different places in the nozzle exit to spoil the gas flow differentially, and to the high power requirements of systems employing hitherto known types of dirigible nozzles or jet "steering" means.

It is therefore an object of the invention to overcome these difficulties and achieve a steering and propulsion system whereby an improved control capability is obtained and the missile performance is greatly enhanced.

According to the present invention, there is provided a steering and propulsion system for an aerial or space vehicle, such as a guided missile, comprising a tail nozzle through which propulsive gas effluent issues which nozzle is dirigible to give steering by the vectored thrust principle, the nozzle being mounted to swivel in all directions about a chosen swivel centre point located forward of the nozzle exit, and wherein the dirigible nozzle has a rearwardly convergent portion, aft of the swivel point, leading up to the nozzle exit mouth and the internal wall of this convergent portion, which serves to deflect the effluent gases when the nozzle is moved angularly out of the straight ahead position about its swivle point, is both annular and domed being formed as a part-spherical surface facing generally forward and having the swivel point as its geometrical centre.

Preferably, the propulsive gas effluent is delivered to the dirigible nozzle by a tail pipe ending in a fixed inner nozzle section within the dirigible nozzle, and when the dirigible nozzle is in the straight ahead position the domed inner surface of the dirigible nozzle is substantially in sealing contact with the rim of the fixed inner nozzle section all around the periphery of the exit mouth of the fixed inner nozzle.

The fixed inner nozzle may be a convergent/divergent nozzle, with the swivel point lying substantially at the centre of its throat.

Advantageously, the dirigible nozzle is mounted to swivel on a spherical bearing assembly which constitutes a flame trap to prevent forward travel of flame and hot gases from the nozzle efflux, and the swivel point at the centre of this bearing assembly lies on the missile fore and aft axis. The co-operating bearing members of the spherical bearing assembly may conveniently be disposed around the throat of the fixed inner nozzle.

Also in the preferred arrangement, a set of aerodynamic control and stabilising fins for the missile has a common mounting with the dirigible nozzle so as to deflect angularly along with it. These fins are advantageously arranged for free spinning around the fore and aft axis of the dirigible nozzle. They may also be arranged to fold down to enable the missile to be placed in a launch tube.

The whole arrangement not only gives more efficient thrust vectoring but also prevents the transmission of aerodynamic roll perturbations from the fins to the missile body. As a result, a wingless missile can be achieved with improved range, and which will respond to its guidance head with sufficient precision and speed to be put to air-to-air use and successfully attack high speed crossing targets.

Figure 2:
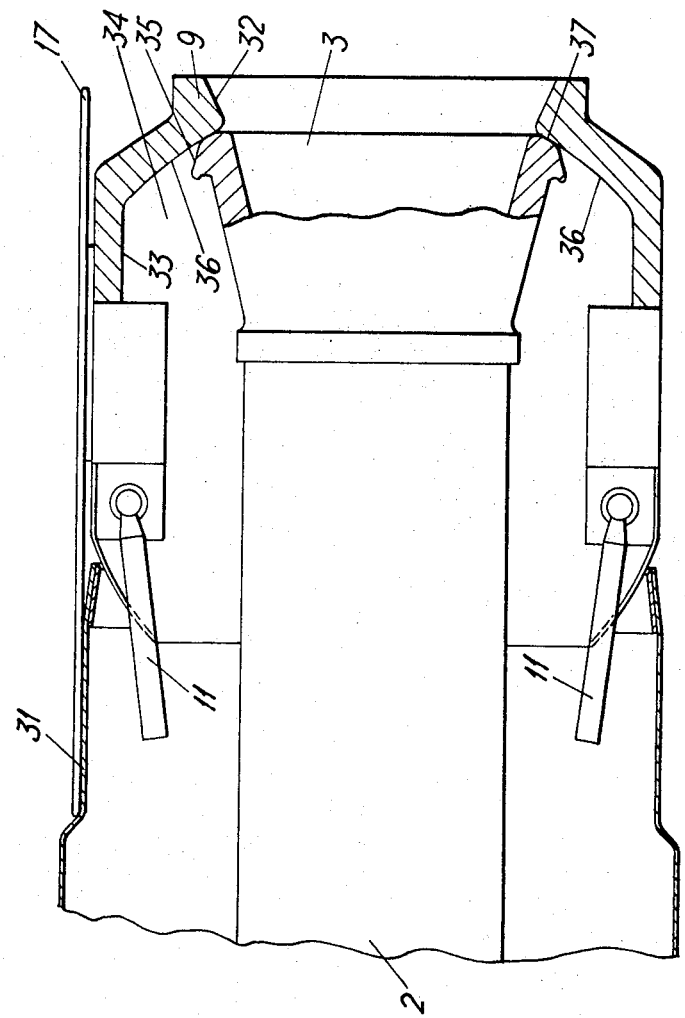
Figure 3:
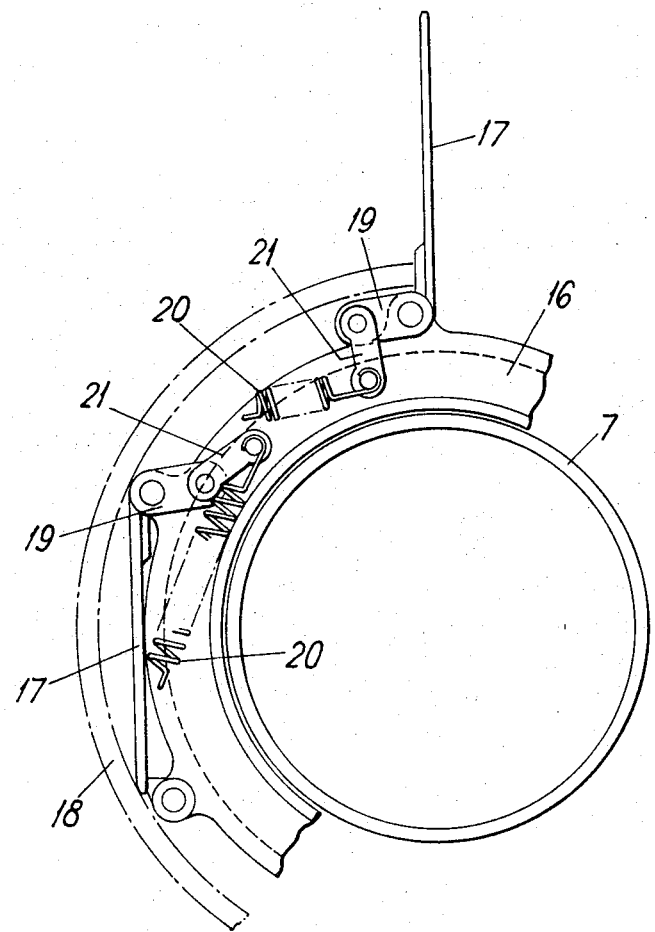

One arrangement in accordance with the invention will now be described by way of example, with reference to the accompanying drawings, in which:

FIG. 1 is a view in longitudinal section of the tail portion of a wingless guided missile, intended primarily for air-to-air use, showing the thrust vectoring nozzle deflected and the stabilising and control fins erected, FIG. 2 is a view, also in longitudinal section, showing the thrust vectoring nozzle aligned with the missile body and the fins folded down in the pre-launch condition, and FIG. 3 is a view in cross section to show one form of fin-erecting mechanism.

In FIG. 1, a wingless missile body indicated generally at 1 has a tail pipe 2, for discharge of the propulsion gases, which ends in a fixed efflux nozzle 3 of the convergent/divergent type. Mounted around the throat 4 of the nozzle 3 is the fixed inner ball member 5 of a spherical bearing assembly 5, 6. A movable bearing ring 6, having its inner surface formed as part of a sphere, seats around the ball member 5 and constitutes the external portion of the spherical bearing assembly. The ring 6 is fitted within an annular housing member 7 which also forms a mounting for both a control fin assembly, indicated generally at 8, and a thrust-deflecting outer nozzle 9.

Mounted around the rear portion of the tail pipe 2 are a number of piston-and-cylinder type actuators 30, the pistons 10 of which are linked by connecting rod 11 to the housing member 7 whereby these actuators 30 are able to swivel the housing member 7, and with it the complete fin assembly and thrust-deflecting nozzle, upon the spherical bearing 5, 6. The arrangement must permit of controlled angular deflection of the fin assembly and outer nozzle universally in all directions with respect to the longitudinal axis of the missile. This can be achieved by means of two actuators, each of the double-acting differential pressure type, disposed 90° from one another around the missile axis; but other arrangements are possible, sich as three single-acting actuators.

In operation, a guidance head in the nose of the missile seeks out the target and gives continuous signal data in regard to the bearing of the target from the missile. From this and other information relating to the missile flight, control signals are derived for application to the servo-valves of the actuators for the purpose of continuously correcting the missile flight, to ensure interception of the target, by deflections of the fin and deflector nozzle assembly. The angular deflections of the fin and deflector nozzle assembly take place about the geometrical centre 24 of the spherical bearing surfaces, which centre lies on the longitudinal axis 12 of the missile and is also the centre of the throat 4 of the fixed inner nozzle 3 substantially in the place where the throat is narrowest. The spherical bearing assembly incorporates a key 13 and a key slot 14 which co-operate to prevent rotation of the housing member 7 about the longitudinal axis of the missile body. The key slot 14 is formed in the fixed ball 5 and extends parallel to the missile axis, whereby the member 7 is able to swivel in one particular plane containing the longitudinal axis of the missile by travel to and fro of the key 13, associated with the bearing ring 6, along the slot 14. Swivelling also in the plane at right angles to said one particular plane is permitted by the fact that the key 13 has a shank 25 of short cylindrical form which is rotatable in a circular hole 26 in the bearing ring 6 about an axis 27 that passes through the bearing centre 24 and lies at right angles to the longitudinal axis 12 of the missile when the fin and outer nozzle assembly is undeflected.

The fin assembly includes a Z-shaped mounting ring 6 which is carried by a ball bearing 15 around the housing member 7 so that it can spin freely about the axis 28 of the deflector nozzle 9. The axis 28 is in alignment with the missile axis 12 when the nozzle is undeflected; and at other times it intersects the axis 12 at the centre 24. The stabilising and control fins 17 are hingedly mounted on the Z-ring 16 by means of hinge pins 29 parallel to the axis 28. The fins 17 are thus able to fold down flat around the nozzle assembly, about the hinge pins 29, when the missile is not in flight; FIGS. 2 and 3 show the fins folded down, the tail portion of the missile casing being recessed somewhat, as at 31, to accomodate them.

Before launching, the missile is contained, or the tail portion at least is contained, within a launch tube, the deflecting nozzle 9 being aligned with the missile body and the fins folded down as in FIG. 2. When the missile is clear of the launch tube 18 the fins are erected automatically. This can be achieved in various ways, one of which is to provide an additional ring upon the Z-ring 16 which is spring-loaded to move through a certain angular distance relatively to the Z-ring 16 and has coupled to it short lever arms that are connected to the fins. Another arrangement is shown in FIG. 3, in which springs 20 are coupled to the fin lever arms 19 by means of links 21. When the springs 20 contract, the links 21 are turned into positions in which they lie more or less radially with respect to the missile axis and the lever arms 19 are swung out until they are substantially at right angles to the links 21, the fins 17 thus becoming erected.

A locking ring 22 is provided around the tail pipe 2 forward of the fin and nozzle assembly to engage the forward face of the housing member 7 and prevent swivelling of the member 7 during the launch phase. The puspose of this is to prevent the missile turning toward the aircraft that launches it. When the missile is clear of the launching aircraft, the locking ring 22 is automatically released.

As will be seen most clearly in FIG. 2, the deflecting outer nozzle 9 has a short divergent mouth portion 32 which is a rearward continuation of the fixed divergent inner nozzle 3 when the outer nozzle 9 is undeflected. Forward of the mouth 32 the outer nozzle becomes of considerably greater diameter, with its largest internal diameter; as seen at 33, giving a wide annular clearance space 34 between the inner wall of the outer nozzle 9 and the fixed inner nozzle 3. This permits the outer nozzle 9 to deflect to an appreciable angle relatively to the fixed inner nozzle 3 before the rim 35 of the fixed nozzle encounters the wall 33 of the outer nozzle. In the region where the diameter of the outer nozzle changes from the maximum internal diameter at 33 to the diameter at the forward end of the short mouth 32, the inner wall of the outer nozzle 9 takes the form of a part-spherical annular dome 36 having its geometrical centre coincident with the swivel centre 24. This dome surface 36 fits close up to a mating part-spherical surface 37 formed as an external annulus around the exit of the divergent mouth of the inner fixed nozzle 3. The surface 37 is also generated about the same centre 24, so that as the outer nozzle 9 deflects angularly the surfaces 36 and 37 remain in mating proximity around one side of the nozzle opening, as can be seen in FIG. 1.

For air-to-air use the missile is, as already indicated, carried by an aircraft in a launch tube with its thrust vectoring nozzle undeflected and locked and its fins folded down. The launch tube may be a simple tube of resin-bonded paper with an internal choke ring, like a piston ring, at or near the rear end. An advantage of such a launch tube is that is provides thermal insulation, both by reason of the tube material itself and because of the air gap between the tube and the missile, which will keep the missile systems at more or less the same temperature for a number of hours in flight. When the missile is fired, the missile propulsion system ignites and the missile is ejected from the launch tube. Immediately on leaving the launch tube the missile fins 17 spring up into the erected position but the thrust vectoring nozzle remains locked.

When the missile is clear of the launching aircraft, a command signal is generated which results in the locking ring 22 becoming unlocked whereupon it is moved forward by a spring 23 which permits the housing member 7 carrying the fin and deflector nozzle assembly to swivel under the control of the servo actuators 30 in all directions about the centre 24. This provides combined thrust vector and aerodynamic control while the propulsion system is operative and simple aerodynamic control during the coasting phase of the missile flight.

The design of the dome deflector nozzle gives efficient thrust vectoring with a very low thrust loss. Moreover, aerodynamic roll perturbations from the fins during control manoeuvres are isolated from the missile body by the fact that the fins are able to spin freely on the bearing 15. This avoids the erratic twitching behaviour during heading changes which has been a characteristic of previous missiles but which tends to upset the operation of the guidance head.

An advantage of the spherical bearing assembly is that it acts as a flame trap, preventing the flame and hot gases of the nozzle efflux from passing forward beyond the space 34 between the inner and outer nozzles. The dome deflector surface 36 and co-operating fixed surface 37 on the inner nozzle 3 also provide a partial flame seal.

However, the invention may be carried into practice by arrangements other than that described and illustrated and in particular, the spherical bearing assembly may be replaced by another form of universal swivel mounting, such as a gimbal mounting. In this case, a separate flame and gas seal needs to be provided; one possibility is the fitting of a sealing flexible diaphragm.

What I claim is:

1. A steering and propulsion system for an aerial or space vehicle, such as a guided missile, comprising a tail nozzle through which propulsive gas effluent issues which nozzle is dirigible to give steering by the vectored thrust principle, the nozzle being mounted to swivel in all directions about a chosen swivel centre point located forward of the nozzle exit, and wherein the dirigible nozzle has a rearwardly convergent portion, aft of the swivel point, leading up to the nozzle exit mouth, the internal wall of this convergent portion, which serves to deflect the effluent gases when the nozzle is moved angularly out of the straight ahead position about its swivel point, is both annular and domed being formed as a part-spherical surface and having the swivel point as its geometrical centre, and there is provided a set of aerodynamic control fins to stabilize the vehicle, said fins being mounted on the dirigible nozzle so as to deflect angularly with it.

2. A system according to claim 1, further comprising a tail pipe and a fixed inner nozzle section terminating said tail pipe within the dirigible nozzle, said tail pipe delivering the propulsive gas effluent to the dirigible nozzle, and wherein when the dirigible nozzle is in the straight ahead position the domed inner surface of the dirigible nozzle is substantially in sealing contact with the rim of the fixed inner nozzle section all around the periphery of the exit mouth of the fixed inner nozzle.

3. A system according to claim 2, wherein the aforesaid rim of the fixed inner nozzle comprises an annular surface that is part-spherical, to match the domed part-spherical surface of the dirigible nozzle, and likewise has the swivel point as its geometrical centre.

4. A system according to claim 2, wherein the fixed inner nozzle is a convergent/divergent nozzle, and the swivel point lies substantially at the centre of the throat of the fixed nozzle.

5. A system according to claim 4, wherein the exit mouth of the dirigible nozzle is divergent and is substantially a rearward continuation of the divergent portion of the fixed inner nozzle when the dirigible nozzle is in the straight ahead position.

6. A system according to claim 4, further comprising a spherical bearing assembly upon which the dirigible nozzle is mounted to swivel, said bearing assembly constituting a flame trap to prevent forward travel of flame and hot gases from the nozzle efflux, the swivel point at the centre of this bearing assembly lying on the missile fore and aft axis.

7. A system according to claim 6, wherein the co-operating bearing members of the spherical bearing assembly are disposed around the throat of the fixed inner nozzle.

8. A system according to claim 6, wherein the spherical bearing assembly comprises a key and co-operating key-way arranged to permit angular deflection of the dirigible nozzle about the swivel point in two planes at right angles to one another while preventing rotation about the fore and aft axis.

9. A system according to claim 1, wherein the fins are arranged for spinning around the fore and aft axis of the dirigible nozzle.

10. A system according to claim 1, wherein the fins are arranged to fold down to enable the missile to be placed in a launch tube.

11. A system according to claim 1, wherein a locking member is provided to lock the dirigible nozzle in the straight ahead position during launching of the missile.

* * * * *